US009667607B2

(12) United States Patent
Mizunashi

(10) Patent No.: US 9,667,607 B2
(45) Date of Patent: May 30, 2017

(54) CONTROL APPARATUS AND COMMUNICATIONS CONTROL METHOD

(71) Applicant: Ryosuke Mizunashi, Tokyo (JP)

(72) Inventor: Ryosuke Mizunashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 352 days.

(21) Appl. No.: 13/665,059

(22) Filed: Oct. 31, 2012

(65) Prior Publication Data

US 2013/0116800 A1 May 9, 2013

(30) Foreign Application Priority Data

Nov. 4, 2011 (JP) ................................ 2011-242720

(51) Int. Cl.
*G05B 15/02* (2006.01)
*H04L 29/06* (2006.01)

(52) U.S. Cl.
CPC ................................ *H04L 63/0485* (2013.01)

(58) Field of Classification Search
None
See application file for complete search history.

(56) References Cited

U.S. PATENT DOCUMENTS

| 6,606,665 | B2 * | 8/2003 | Govindaraj | H04L 29/06 700/180 |
| 6,832,116 | B1 * | 12/2004 | Tillgren | B41J 2/315 178/18.01 |
| 7,007,103 | B2 | 2/2006 | Pinkerton et al. | |
| 7,698,001 | B2 * | 4/2010 | Kamalaksha | G06F 15/16 370/232 |
| 7,877,168 | B1 * | 1/2011 | Porter | A01G 25/167 239/63 |
| 7,987,003 | B2 * | 7/2011 | Hoffberg | G05B 15/02 370/200 |
| 2002/0108108 | A1 | 8/2002 | Akaiwa et al. | |
| 2003/0055888 | A1 | 3/2003 | Matsumoto et al. | |

(Continued)

FOREIGN PATENT DOCUMENTS

JP   2000-261515     9/2000
JP   2003-67267 A    3/2003

(Continued)

OTHER PUBLICATIONS

Aug. 25, 2015 Japanese Office Action issued in corresponding Japanese Application No. 2011-242720.

(Continued)

*Primary Examiner* — Robert Fennema
*Assistant Examiner* — Jay Jung
(74) *Attorney, Agent, or Firm* — Harness, Dickey & Pierce, P.L.C.

(57) ABSTRACT

A control apparatus is disclosed, including a first processor which can be connected to a network; and a second processor which includes a user interface, which is communicatively connected to the first processor, and which performs equipment control based on information input via the user interface and information obtained by the first processor from the network, wherein the first processor includes a communications control unit which conducts a protocol control and/or cryptographic process in communications via the network.

19 Claims, 15 Drawing Sheets

(56) References Cited

U.S. PATENT DOCUMENTS

| | | | |
|---|---|---|---|
| 2006/0242461 A1* | 10/2006 | Kondo | G06F 9/3824 714/21 |
| 2007/0168046 A1* | 7/2007 | Misawa | G06F 3/14 700/1 |
| 2009/0112072 A1* | 4/2009 | Banet et al. | 600/301 |
| 2009/0316200 A1 | 12/2009 | Kubota et al. | |
| 2010/0037169 A1* | 2/2010 | Beaty | G06F 11/324 715/772 |
| 2010/0235619 A1 | 9/2010 | Inoue | |
| 2011/0015835 A1 | 1/2011 | Takahashi et al. | |
| 2011/0054710 A1* | 3/2011 | Imes | F24F 11/0086 700/286 |
| 2011/0055434 A1* | 3/2011 | Pyers | G06F 1/3203 710/14 |

FOREIGN PATENT DOCUMENTS

| | | |
|---|---|---|
| JP | 2003-333076 | 11/2003 |
| JP | 2004-054143 A | 2/2004 |
| JP | 2004-94808 | 3/2004 |
| JP | 2008-90285 A | 4/2008 |
| JP | 2010-219604 A | 9/2010 |
| JP | 2011-021717 | 2/2011 |

OTHER PUBLICATIONS

Japanese Office Action mailed on Mar. 8, 2016, to corresponding Japanese Patent Application No. 2011-242720.

* cited by examiner

CONTROL APPARATUS AND COMMUNICATIONS CONTROL METHOD

TECHNICAL FIELD

The present invention relates to a control apparatus which performs equipment control based on data obtained from a network and a communications control method thereof.

BACKGROUND ART

In a related art, an equipment unit is prevalent which has embedded therein a control apparatus which performs various equipment controls based on data obtained from a network; a printer and an MFP (multifunction printer), etc., which perform printing, etc.; a projector which performs projecting based on data input via the network from a different computer.

Patent Document 1 discloses a computer which can be connected to a provider network and/or the Internet.

Moreover, Patent Document 2 discloses an equipment unit which allows transmission of information to a network while being in a sleep mode.

Furthermore, Patent Document 3 discloses that a process related to communications is expressed in a hierarchy which is divided into a transport layer, a network layer, etc.

PATENT DOCUMENTS

Patent Document 1: JP2011-21717A
Patent Document 2: JP2000-261515A
Patent Document 3: JP2003-333076A With this type of control apparatus, there exists a problem that a burden of communications-related processes such as an SSL encryption process and a retransmission process in TCP/IP is large, so that, as a result, an application process to be executed is delayed. An application process includes a projecting process for the above-described projector and scanning and image forming processes for the MFP. Moreover, a process which reflects various instruction inputs entered via a user interface applies to the application process.

DISCLOSURE OF THE INVENTION

An object of the present invention is to provide a control apparatus which allows reducing an impact that a processing burden related to communications has on equipment control in one aspect.

According to an embodiment of the present invention, a control apparatus is provided, including a first processor which can be connected to a network; and a second processor which includes a user interface, which is communicatively connected to the first processor, and which performs equipment control based on information input via the user interface and information obtained by the first processor from the network, wherein the first processor includes a communications control unit which conducts a protocol control and/or cryptographic process in communications via the network.

An aspect of the present invention makes it possible to provide a control apparatus which allows reducing an impact that a processing burden related to communications has on equipment control in one aspect.

BRIEF DESCRIPTION OF THE DRAWINGS

Other objects, features, and advantages of the present invention will become more apparent from the following detailed descriptions when read in conjunction with the accompanying drawings, in which.

BEST MODE FOR CARRYING OUT THE INVENTION

Embodiments will be given below with reference to the attached drawings for explaining the best mode for carrying out the present invention.

Embodiments

Below, a control apparatus 30 and a projector 1 which embeds therein the same according to one embodiment of the present invention is described with reference to drawings.

Configuration

Figure 1:
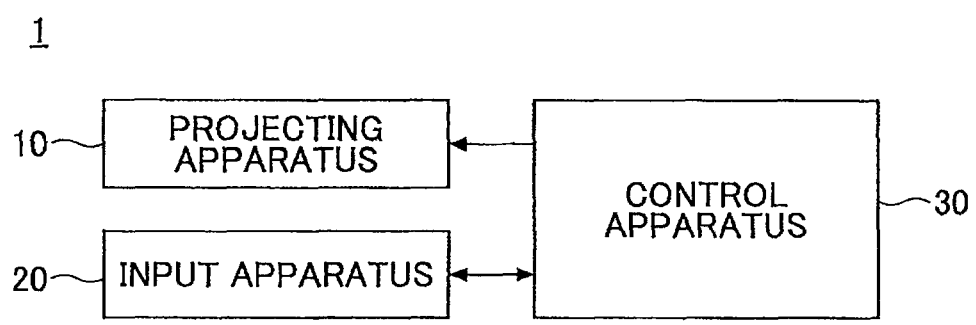
FIG. 1 is a diagram illustrating an exemplary system configuration of a projector 1 according to one embodiment of the present invention.

FIG. 1 is an exemplary system configuration of the projector 1 according to one embodiment of the present invention. The projector 1 includes a projecting apparatus 10; an input apparatus 20; and a control apparatus 30 as main constituting elements.

The projecting apparatus 10 includes a color display mechanism, a lamp to be a light source, for example. The input apparatus 20 includes a power supply button, a selection instructing button, a luminance adjusting switch, etc.

Figure 2:
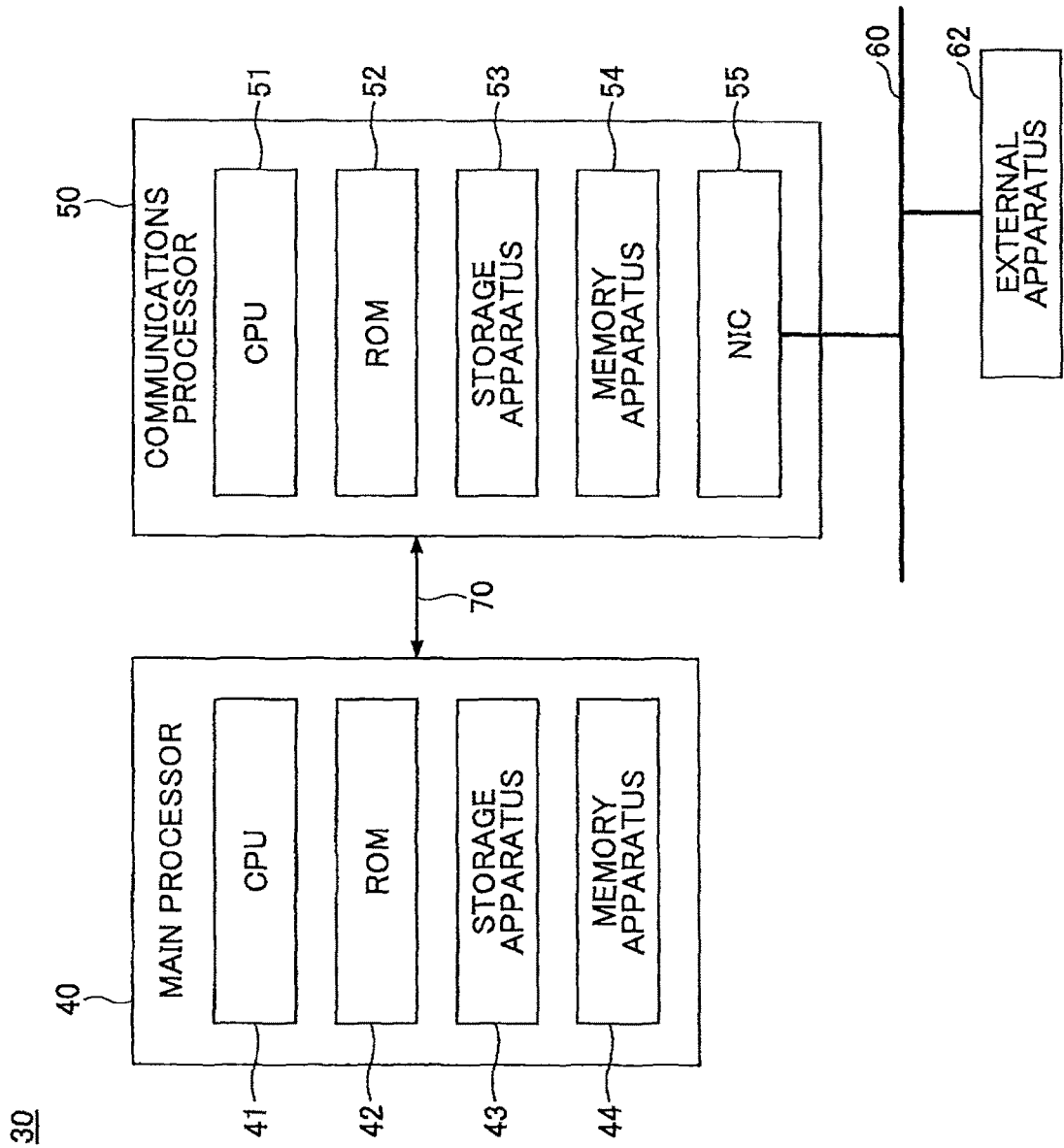
FIG. 2 is a diagram illustrating an exemplary hardware configuration of a control apparatus 30.

FIG. 2 is an exemplary hardware configuration of the control apparatus 30, which includes a main processor 40 and a communications processor 50.

The main processor 40 includes hardware units such as a CPU 41 which executes programs; a ROM 42 which has stored therein a BIOS (Basic Input/Output System); a storage apparatus 43 which functions as a program memory; a memory apparatus 44, including a RAM or a cache memory which functions as a working memory, etc.

Similarly, the communications processor 50 includes hardware units such as a CPU 51; a ROM 52; a storage apparatus 53; a memory apparatus 54, etc. Moreover, the communications processor 50 includes a NIC (Network Interface Card) 55 for communicating with an external apparatus 62 via a network 60 such as a LAN (local area network), etc. The external apparatus 62 is a computer such as a personal computer, a server apparatus, etc., for example. The network 60 may be wired or wireless.

On the other hand, the main processor 40 and the communications processor 50 are connected by a communication line 70 through which communications are conducted by PCIe (PCI Express), for example. Communications conducted between the main processor 40 and the communications processor 50 may be wireless communications.

Figure 3:
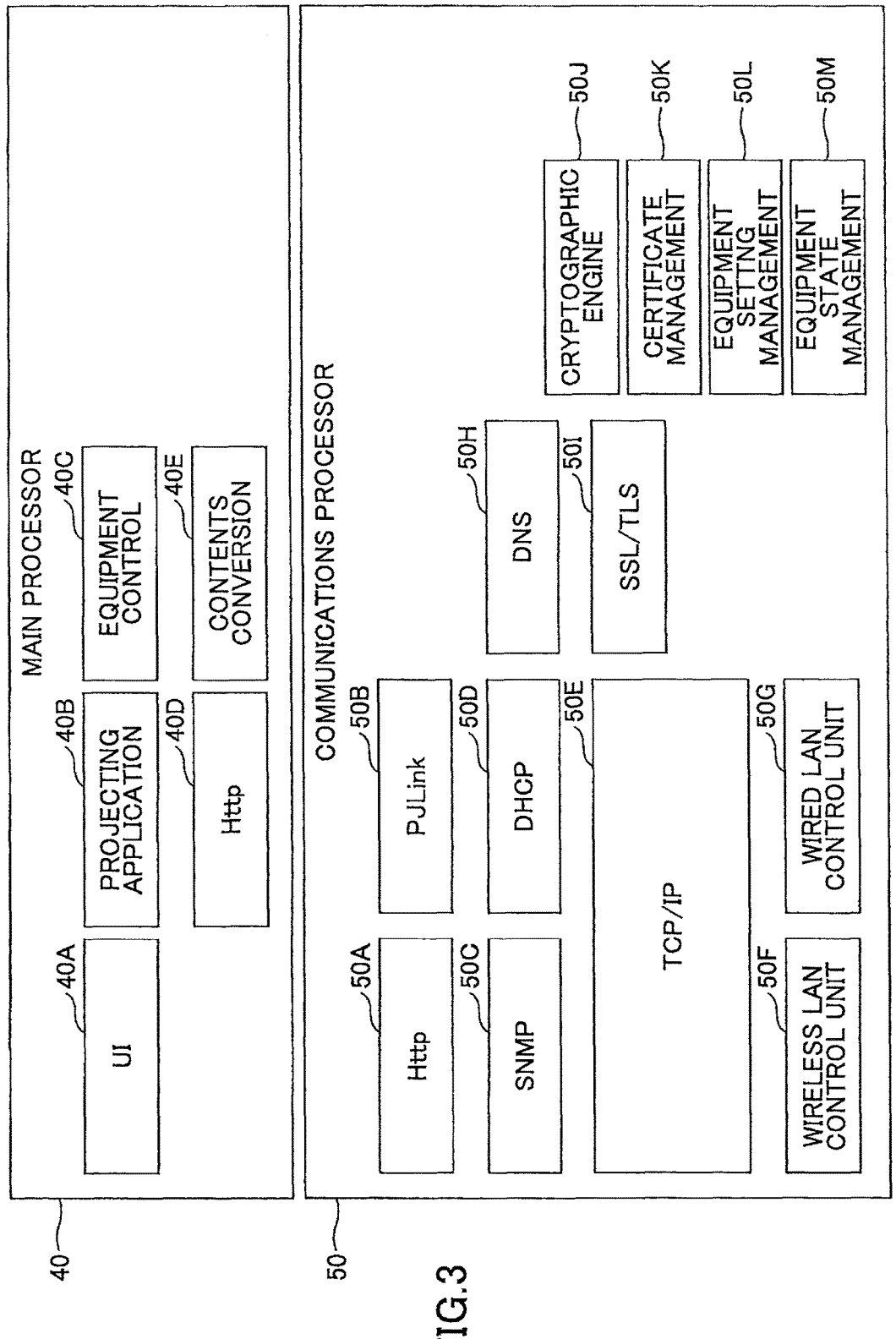
FIG. 3 is a diagram illustrating an exemplary software configuration of the control apparatus 30.

FIG. 3 is an exemplary software configuration of the control apparatus 30.

On the main processor 40 of the control apparatus 30, a UI (User Interface) 40A; a projecting application program (below abbreviated as "application") 40B; equipment management 40C; an HTTP (Hyper Text Transfer Protocol) 40D; contents conversion 40E such as SOAP (Simple Object Access Protocol), JSON (Java Script (registered trademark) Object Notation), etc., operate.

On the other hand, on the communications processor 50 of the control apparatus 30, an HTTP 50A, a PJ Link 50B, a SNMP (Simple Network Management Protocol) 50C, a DHCP (Dynamic Host Configuration Protocol) 50D, a TCP/IP (Transmission Control Protocol/Internet Protocol) 50E, a wireless LAN control unit 50F, a wired LAN control unit 50G, a DNS (Domain Name System) 50H, an SSL/TLS (Secure Sockets Layer/Transport Layer Security) 50I, a cryptographic engine 50J, certificate management 50K, equipment setting management 50L, and equipment state management 50M operate.

Figure 4:
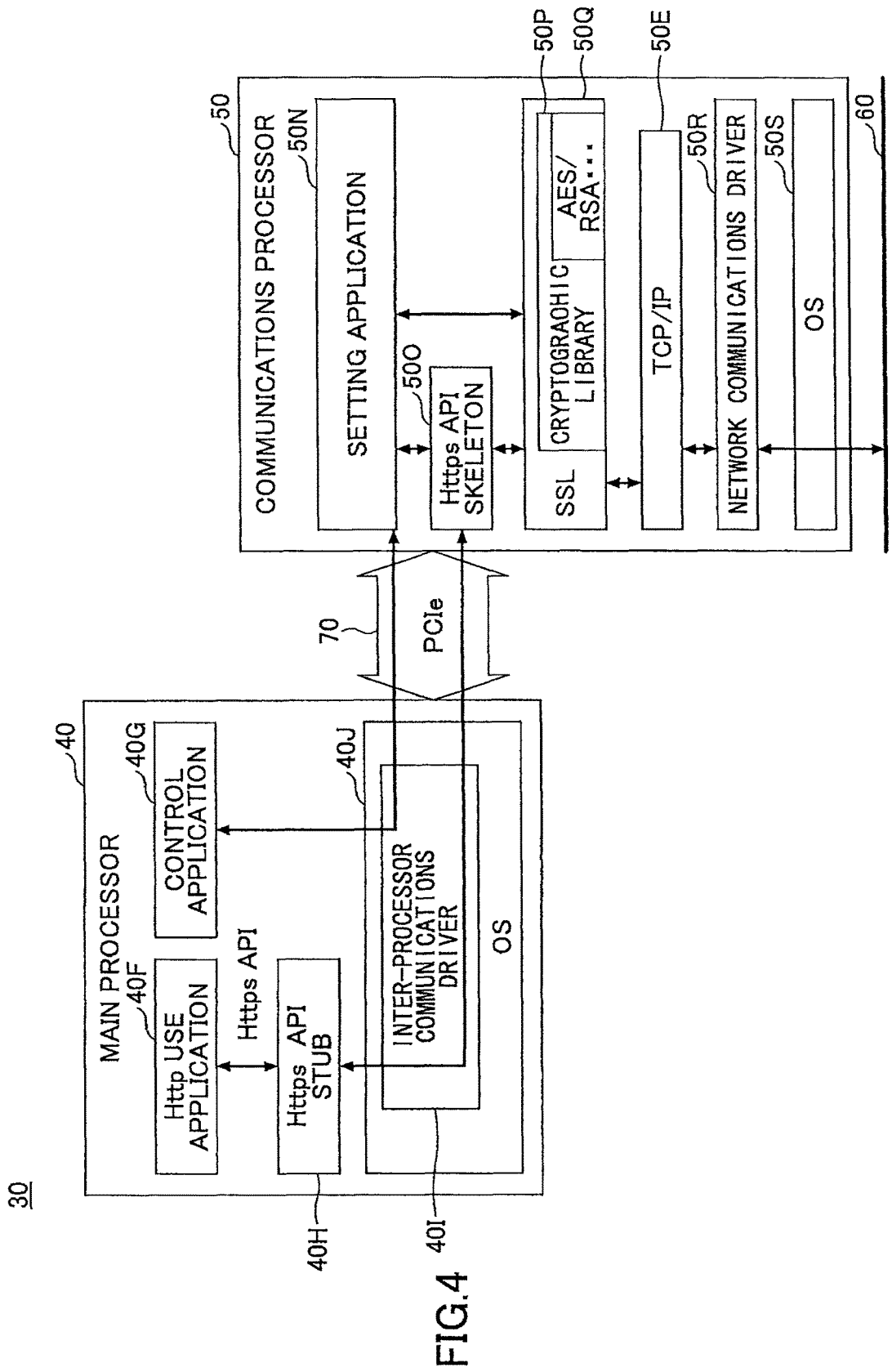
FIG. 4 is a diagram illustrating, from a viewpoint which is different from that for FIG. 3, a software arrangement of the control apparatus 30 in a certain state.

FIG. 4 is a diagram illustrating, from a viewpoint which is different from that for FIG. 3, a software arrangement of the control apparatus 30 in a certain state.

In the above-described state, on the main processor 40 of the control apparatus 30, an OS (Operating system) 40J including an inter-processor communications driver 401, an HTTPS API stub 40H, an HTTPS use application 40F, a control application 40G and other application programs operate. The Http use application 40F includes the projecting application 40B, etc., in FIG. 3. The control application 40G includes the equipment management 40C, etc., in FIG. 3. According to the present embodiment, even when the OS 40J includes the TCP/IP function, such a function is not used.

On the other hand, on the communications processor 50 of the control apparatus 30, an OS 50S; a network communications driver 50R; a TCP/IP 50E; an SSL 50Q which includes a cryptographic library 50P; an HTTPS API skeleton 50O; a setting application which performs setting of security such as SSL, etc.

The TCP/IP 50E and the network communications driver 50R conducts processing of transport, Internet, data link, and physical layers in order to conduct communications with the external apparatus 62 via the network 60. In other words, processes of specifying a destination/source application, error control; sequence control (guarantee arrival order); error correction; retransmission control; selection of communications route; data relaying; delivery of signals; and conversion of electrical signals, etc.

Moreover, the SSL 50Q performs encryption and decryption processes in communications via the network 60 with a desired scheme included in cryptographic schemes stored in the cryptographic library 50P.

Figure 5:
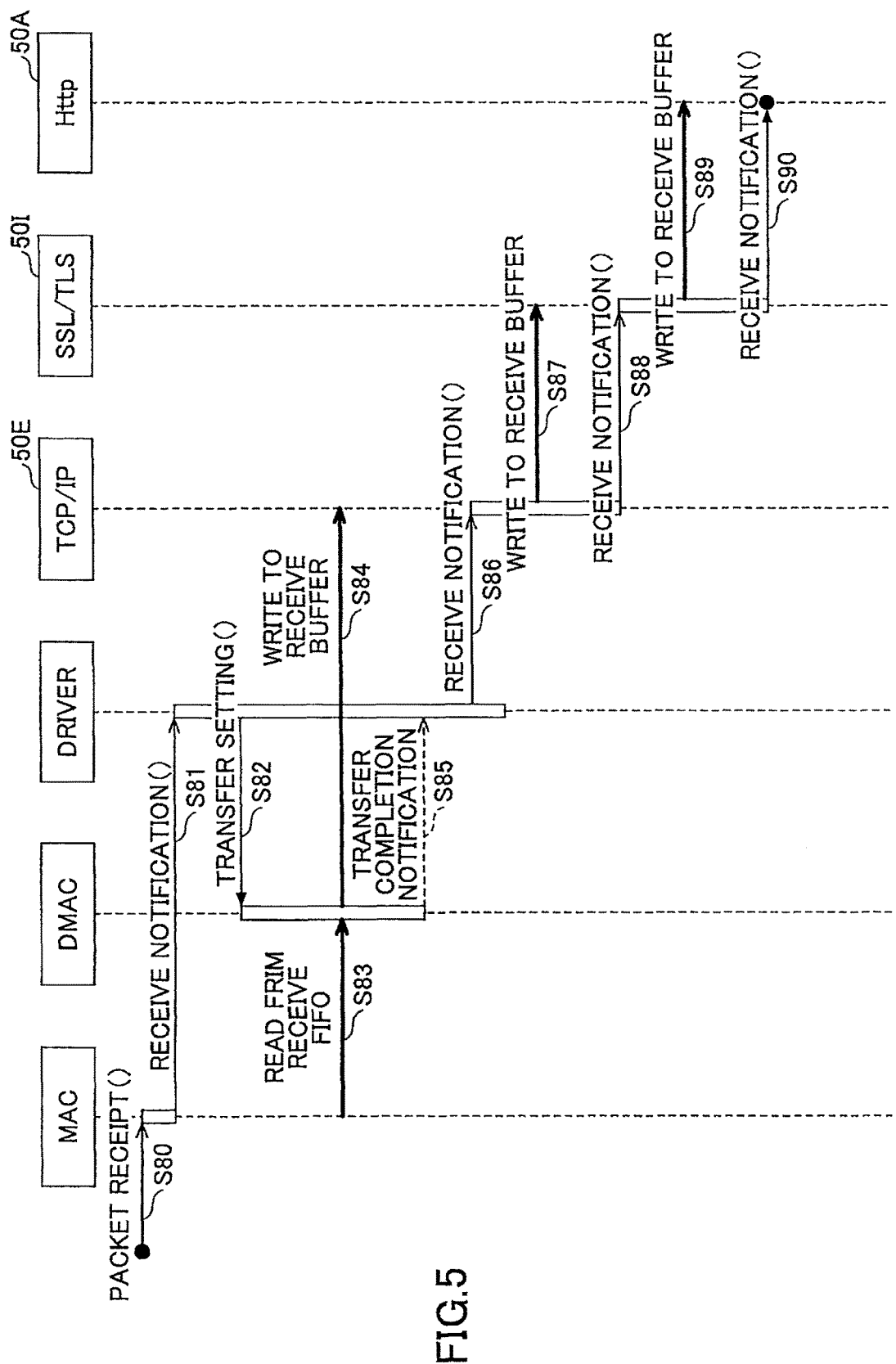
FIG. 5 is sequence diagram illustrating a flow of processing packet data received from a network by a communications processor 50.

FIG. 5 is sequence diagram illustrating a flow of processing packet data received from the network by the communications processor 50.

When a MAC receives a packet from the network 60 (S80), the MAC performs a receive notification to a driver (S81).

The driver transmits a transfer setting to a DAMC (S82). The DAMC reads the packet received by the MAC from a receive FIFO (S83), writes it to a receive buffer (for TCP/IP) (S84), and transmits a transfer completion notification to the driver (S85).

The receive FIFO and respective receive buffers are regions set on the memory apparatus 54, for example. Moreover, the MAC, the DMAC, and the driver are parts of functions which the network communications driver 50R has, for example.

When the transfer completion notification is received, the driver transmits a receive notification to the TCP/IP 50E (S86).

The TCP/IP 50E performs a TCP/IP process on data written into the receive buffer (for TCP/IP) and writes the processed data into a receive buffer (for SSL) (S87). Then, it transmits a receive notification to the SSL/TLS 50I.

The SSL/TLS 50I performs an SSL/TLS process on data written into the receive buffer (for SSL) and writes the processed data into a receive buffer (for HTTP) (S89). Then, it transmits a receive notification to the HTTP 50A (S90).

In communicating between the main processor 40 and the communications processor 50, a communications process of an application layer by an HTTPS scheme, etc., via an HTTPS API stub 40H and an HTTPS API skeleton 50O is conducted. Communications are conducted in the HTTPS scheme when the communications processor 50 transfers, to the main processor 40, data obtained via the network 60, for example. This allows so-called "contents data", not data divided into packet data sets, to be transmitted and received, making it possible to reduce a burden of data processing in the main processor 40.

On the other hand, an instruction signal by the control application 40C is transmitted to the setting application 50N without going through the HTTPS API stub 40H and the HTTPS API skeleton 50O.

Such a software arrangement makes it possible to reduce an amount of usage of CPU resources required for communications in the main processor 40 since the control apparatus 30 according to the present embodiment has arranged in the communications processor 50 those processes which may be completed by network resources, including a core protocol process from a physical layer to a transport layer and a cryptographic communications process (including updating, etc., of a cryptographic key).

Moreover, a communications-related process and an application process in the main processor 40 may be performed in parallel, making it possible to implement an efficient process such as obtaining new data from the network 60 while the application of the main processor 30 is executing data obtained from the network 60.

Figure 6:
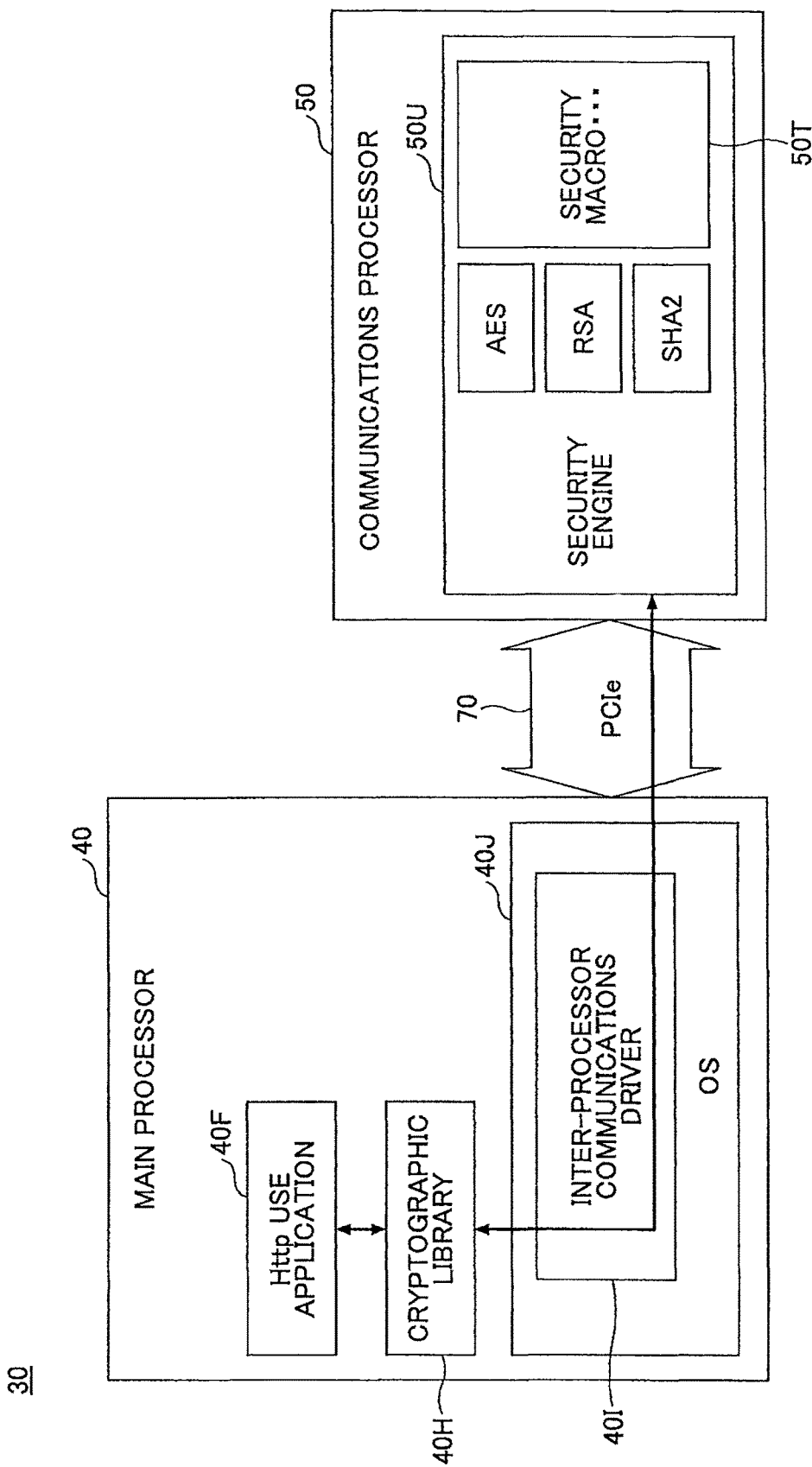
FIG. 6 is a software configuration diagram of the control apparatus 30 when a cryptographic library is arranged on a main processor 40.

A cryptographic library may be arranged on the main processor 40 and only an execution of a cryptographic algorithm may be performed by the communications processor 50. FIG. 6 is a software configuration diagram of the control apparatus 30 when the cryptographic library is arranged on the main processor 40. In this case, the communications processor includes a security engine 50U including a security macro 50T, making it possible to use the security macro 50T with a desired security protocol.

Processes and Data Structure

Below, various processes executed by the control apparatus 30 and data structure are described.

Figure 7:
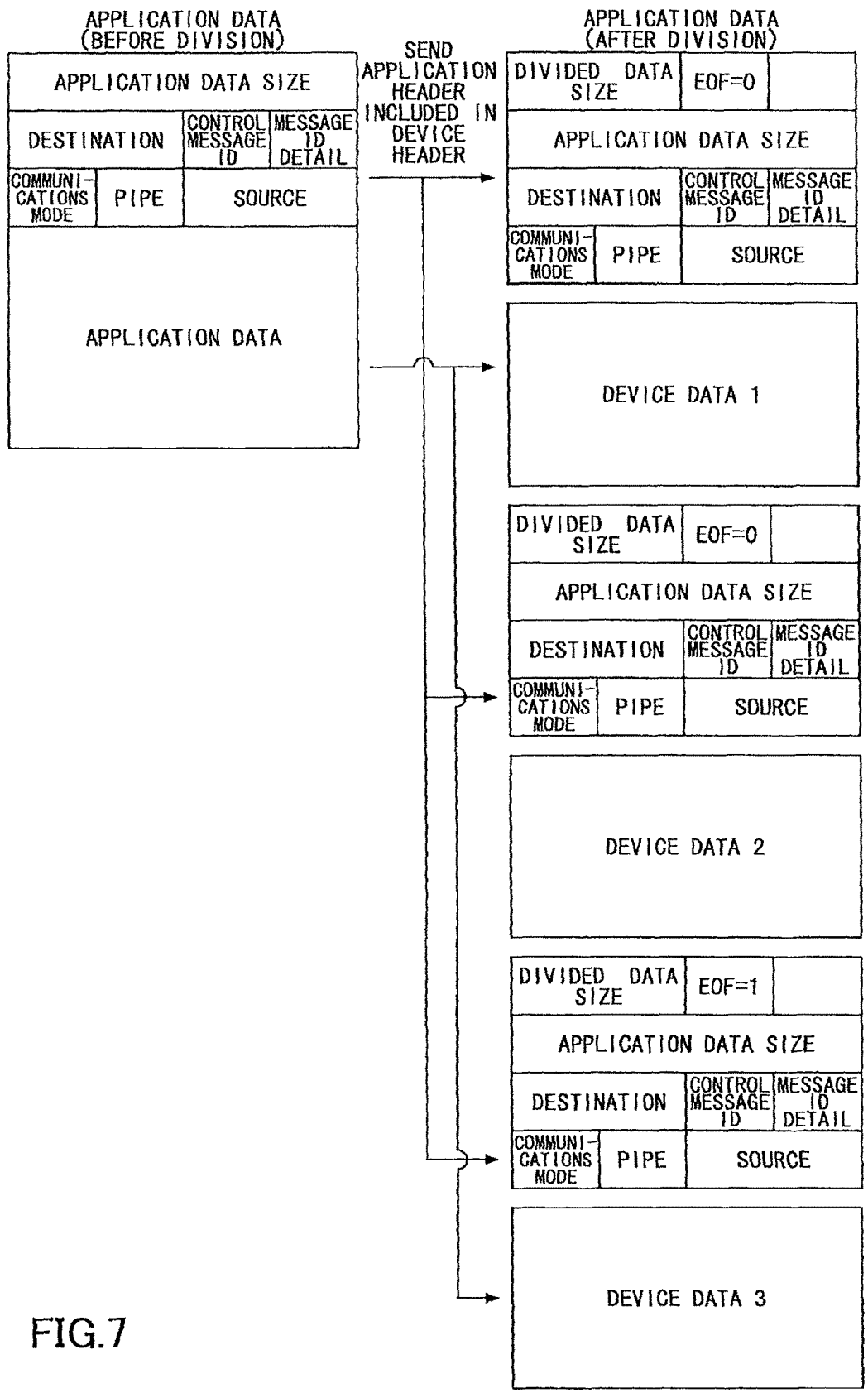
FIG. 7 is a diagram illustrating a structure of application data transmitted and received between the main processor 40 and the communications processor 50 and a structure of data in which application data are divided.

FIG. 7 is a diagram illustrating a structure of application data transmitted and received between the main processor 40 and the communications processor 50 and a structure of data in which application data are divided. According to the present embodiment, when application data transmitted and received between the main processor 40 and the communications processor 50 have a size which is greater than a standard size, they are divided for transmitting and receiving. As illustrated, the application data before division includes an application data size, a destination, a control message ID, a message ID detail, a communications mode, a pipe, a source, and application data (body).

On the other hand, application data after the division have applied a divided data size and a flag EOF which indicates whether there are final data. Moreover, a body portion of the divided application data is called device data 1, 2, and 3.

Between the main processor 40 and the communications processor 50, a message is transmitted and received in a format of "network transmission request" and "network receive data share". The network transmission request and the network receive data share are divided into a request and a response. The transmitting side is prohibited from transmitting a next network transmission request (a request) until a network transmission request (a request) is transmitted and a receiving (of a response) occurs.

The "network transmission request" (request) includes contents data including an HTTP header and body information, a control parameter such as a certificate CN check yes/no, operation at the time of server authentication failure (continue/disconnect/non-secure communications), use of a proxy server (yes/no), a protocol type indicating HTTP or not, a destination port number indicating a destination within an apparatus of a destination, an authenticating certification set, a certifying CN name, a destination host which is expressed by an IP address or a host name. For non-secure communications, the certifying CN name is filled with 0x00, etc. Moreover, contents data correspond to the above described application data.

On the other hand, a "network transmission request" (response) includes information on a source of the response; transmission results showing success/failure of respective requests.

The "network receive data share" (request) includes content data and control parameters including types of content (projecting data, firm data, Web content, etc.), and a source. The content data includes Web content in which a projecting job (below described) generating command and completing command from a PC utility, firm data in which are linked firm data for the main processor 40, firm data for the communications processor 50, and firm data for energy saving control (below described), and projecting data such as video, image, voice, etc., that are projected by the projecting apparatus 10.

The "network receive data share" (response) includes Web content including body information and an HTTP header to be transmitted to a communications counterparty and received results indicating success/failure of receiving. The HTTP header and body information are divided by a CRLF (a carriage return/line feed), for example.

Figure 8:
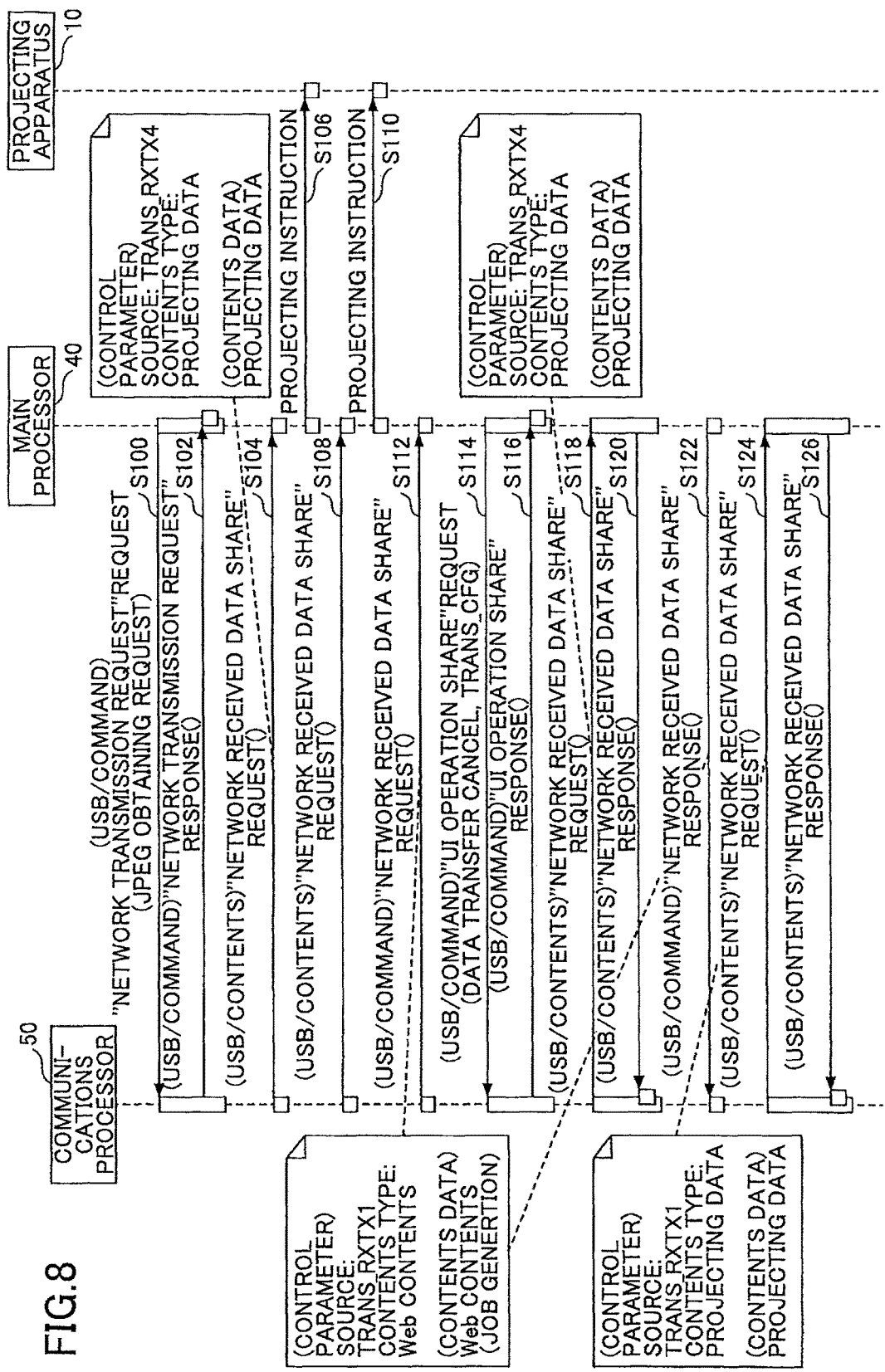
FIG. 8 is a diagram exemplifying a flow of a process of the control apparatus 30 which obtains from an external apparatus 62 projecting data for which a receive instruction was made from the main processor 40 and which projects projecting data obtained and data transmitted and received in respective communications phases.

FIG. 8 is a diagram exemplifying a flow of a process of the control apparatus 30 which obtains from an external apparatus 62 projecting data for which a receive instruction was made from the main processor 40 and which projects the projecting data obtained and data transmitted and received in respective communications phases.

As shown, first, a "network transmission request" (request) is transmitted from the main processor 40 to the communications processor 50 (S100). Here, a JPEG obtaining request is transmitted, for example. The communications processor 50 returns a "network transmission request" (request) to the main processor 40 (S102).

Then, the communications processor 50 transmits a "network receive data share" (request) to the main processor (S104).

When the "network receive data share" is received again, the main processor 40 instructs the projecting apparatus 10 to perform projecting based on projecting data stored in the memory apparatus 44 (S106).

When the "network receive data share" is received (S108), the main processor 40 instructs the projecting apparatus 10 to perform projecting based on projecting data stored in the memory apparatus 44 (S110).

Then, the communications processor 50 transmits a "network receive data share" (request) to the main processor 40 (S112). The contents data transmitted here are Web contents related to job creation. The main processor 110 returns a "UI operation share" (request) (S114). Data returned here are for instructing that data transfer be cancelled.

The communications processor 50 returns a "UI operation share" (response) to the main processor 40 (S116).

Thereafter, until data which are a flag EOF=1 as described above are transmitted, transmission of projecting data by the communications processor 50 and a response from the main processor 40 are continued (S118, S120, S124, and S126). In the process, a response of "network receive data share" which is transmitted from the communications processor 50 to the main processor 40 in S112 is made (S122).

Figure 9:
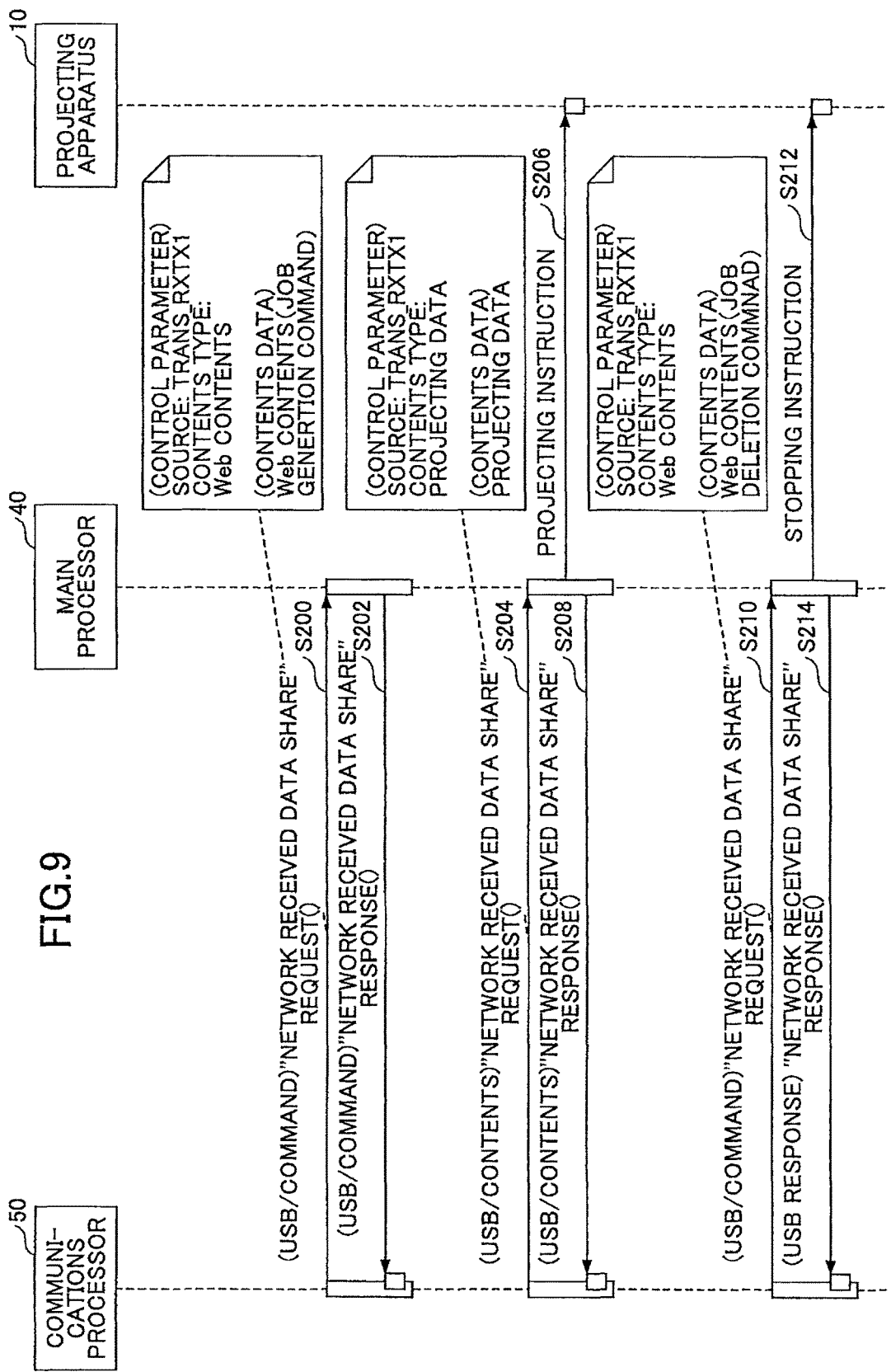
FIG. 9 is a diagram exemplifying a flow of a process of the control apparatus 30 when it obtains via a network 60 projecting data which were autonomously transmitted from the external apparatus 62 side and which projects projecting data obtained and data transmitted and received in respective communications phases.

FIG. 9 is a diagram exemplifying a flow of a process of the control apparatus 30 when it obtains via a network 60 projecting data which were autonomously transmitted from the external apparatus 62 side and which projects projecting data obtained and data transmitted and received in respective communications phases.

First, the communications processor 50 transmits a "network receive data share" (request) to the main processor (S200). The contents data transmitted here are Web contents related to job creation. When the contents data are obtained, the main processor 40 transmits a "network receive data share" (response) to the communications processor (S202).

Then, the communications processor 50 transmits a "network receive data share" (request) to the main processor 40 (S204). The contents data are projecting data. The main processor 40 controls the projecting apparatus 10 such as to perform projecting based on projecting data. Then, the main processor 40 transmits a "network receive data share" response to the communications processor 50.

Next, the communications processor 50 transmits a "network receive data share" (request) to the main processor 40 (S210). The contents data are Web contents (including a job cancellation command). When the contents data are obtained, the main processor 40 controls the projecting apparatus 10 such as to stop projecting (S212). Then, the main processor 40 transmits a "network receive data share" response to the communications processor 50 (S214).

The communications processor 50 included by the control apparatus 30 according to the present embodiment may connect to the external apparatus 62 via a proxy server.

Figure 10:
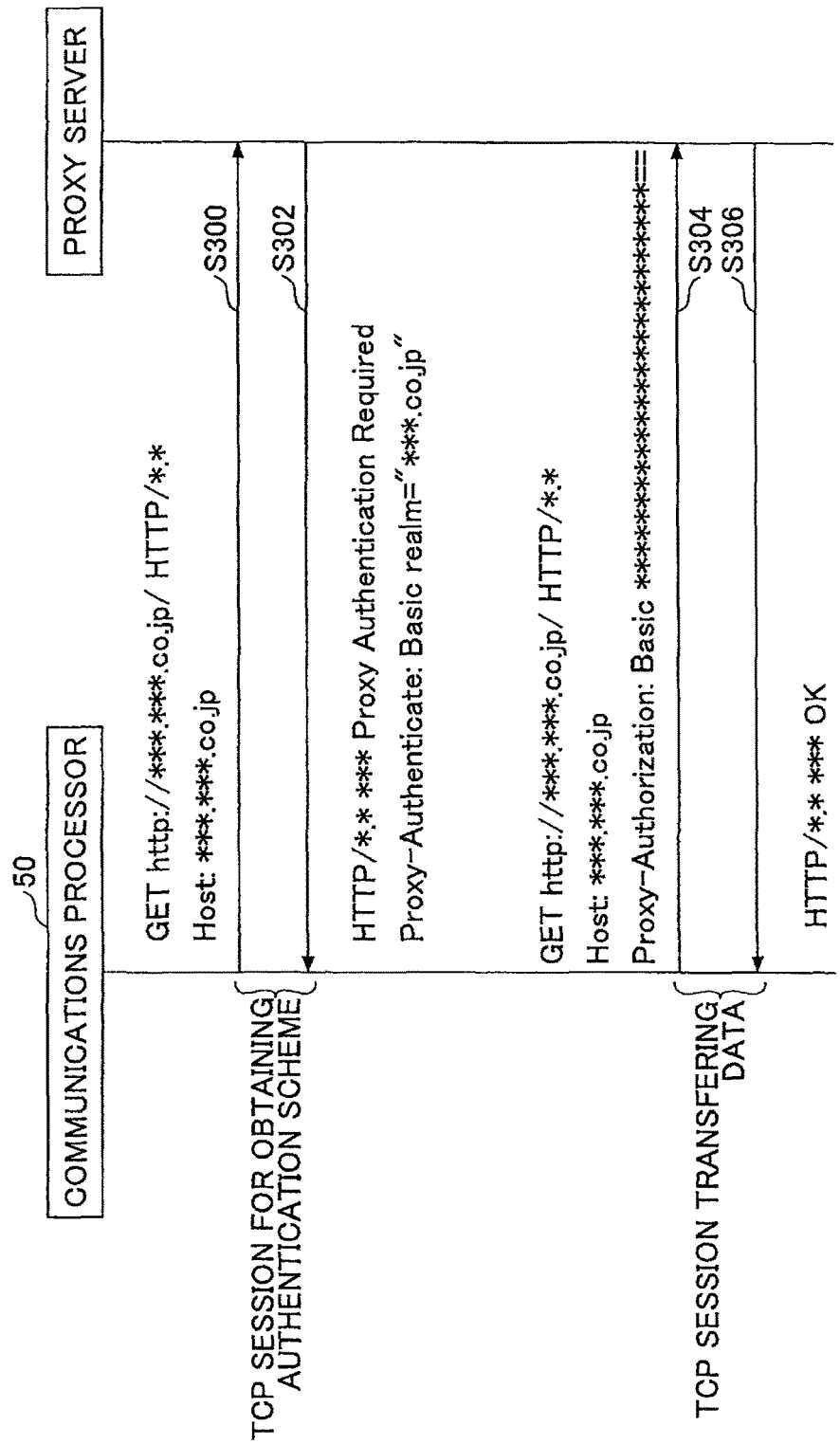
FIG. 10 is a sequence diagram illustrating a flow of data transmitted and received between the communications processor 50 and a proxy server when connecting to the proxy server in the clear.

FIG. 10 is a sequence diagram illustrating a flow of data transmitted and received between the communications processor 50 and the proxy server when connecting to the proxy server in the clear.

First, data with content shown are transmitted (S300) from the communications processor 50 to the proxy server, from which proxy server a response is made (S302). This completes a TCP session for obtaining an authentication scheme.

Next, data with content shown are transmitted (S304) from the communications processor 50 to the proxy server, from which proxy server a response is made (S306). This completes a TCP session for transferring data.

Figure 11:
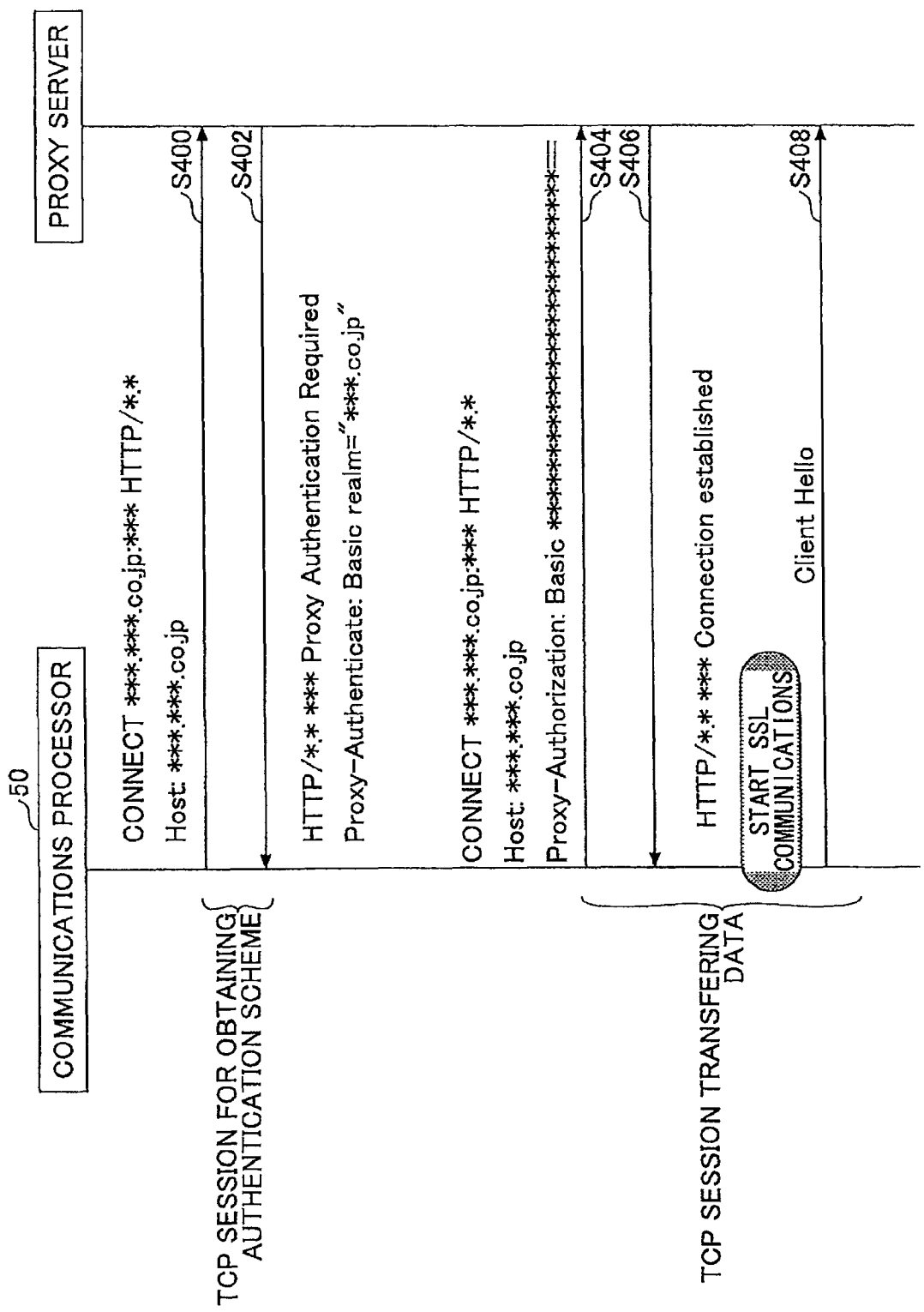
FIG. 11 is a sequence diagram illustrating a flow of data transmitted and received between the communications processor 50 and the proxy server when connecting to the proxy server with SSL data.

FIG. 11 is a sequence diagram illustrating a flow of data transmitted and received between the communications processor 50 and the proxy server when connecting to the proxy server with SSL data.

First, data with content shown are transmitted (S400) from the communications processor 50 to the proxy server, from which proxy server a response is made (S402). This completes a TCP session for obtaining an authentication scheme.

Next, data with content shown are transmitted (S404) from the communications processor 50 to the proxy server, from which proxy server a response is made (S406). This starts SSL communications and, when "Client Hello" is transmitted (S408), the TCP session for transferring data is completed, after which communications according to an SSL protocol are conducted.

Below, a flow for the communications processor 50 to perform a process using already established communications is described.

Figure 12:
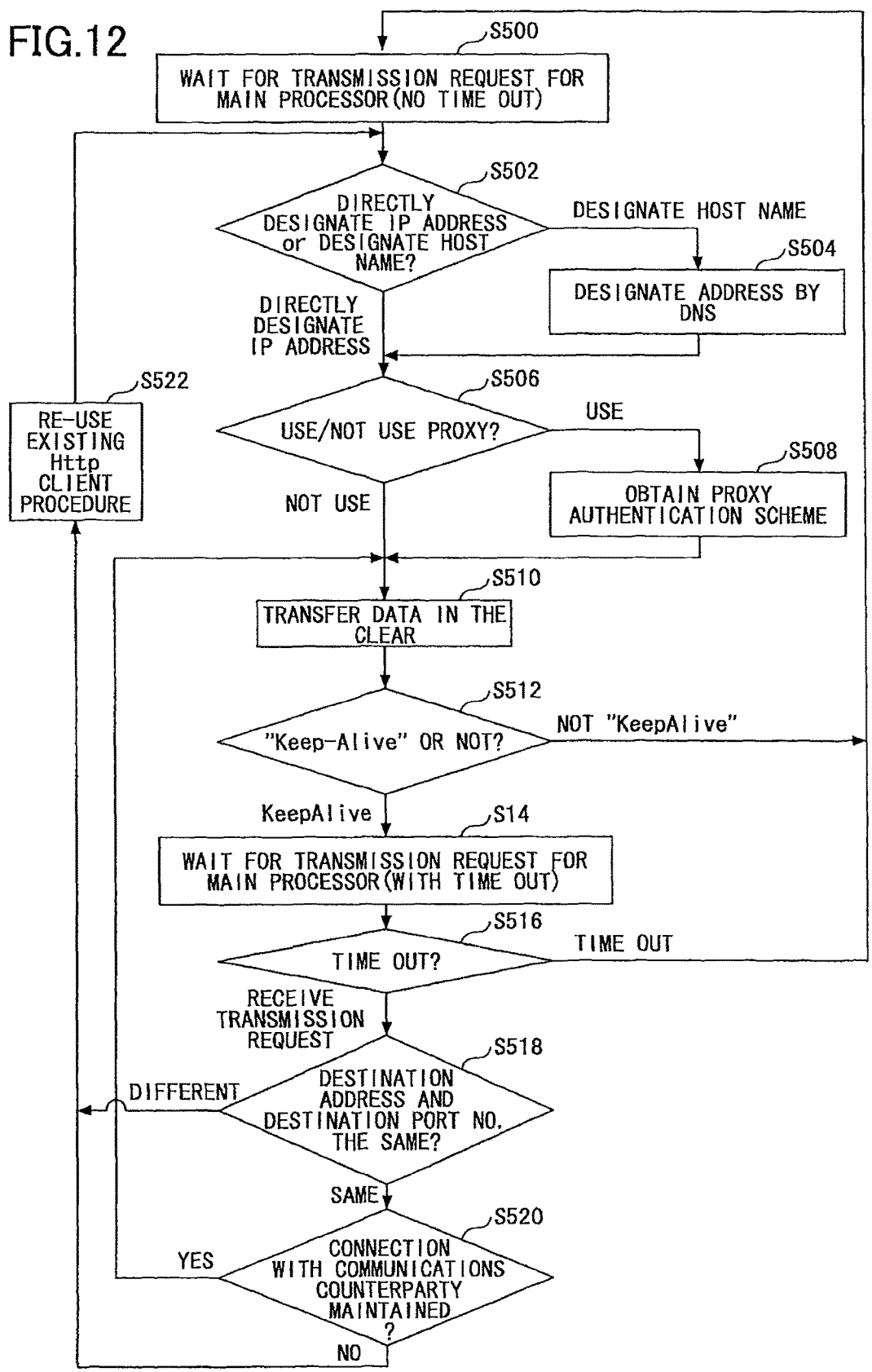
FIG. 12 is a flowchart illustrating a flow of a process executed by a communications processor 50 when communicating in the clear.

FIG. 12 is a flowchart illustrating a flow of a process executed by the communications processor 50 when communicating in the clear.

First, the communications processor 50 turns into a state in which it waits for a transmission request from the main processor 40 (a network transmission request) (S500). No time out is set for this state.

When the transmission request from the main processor 40 is received, the communications processor 50 determines whether a direct designation of an IP address is made or a designation of a host name is made in the transmission request (S502).

When the host name is designated, a DNS 50H of the communications processor 50 functions, performing an address resolution by DNS (S504).

Next, the communications processor 50 determines whether using a proxy is designated in the transmission request (S506). When using the proxy is designated in the transmission request, the communications processor 50 performs processes of S300 and S302 in FIG. 10 with the proxy server and obtains a proxy authentication scheme (S508).

Next, the communications processor 50 performs transferring of data in the clear (S510).

Next, the communications processor 50 determines whether "Keep-Alive" is designated in the transmission request (S512).

If not, the communications processor 50 returns to the state in S500 in which it waits for requesting transmission.

If yes, the communications processor 50 turns into a state in which it waits for a transmission request from the main processor 40 with a time-out set (S514). When a time-out is reached, the communications processor 50 returns to a state in S500 in which it waits for a transmission request.

If a transmission request is received before the time-out is reached, the communications processor 50 determines whether a destination address and a destination port number are the same as previous ones (S518). If the destination address and the destination port number are different from the previous ones, the communications processor 50 reuses an existing HTTP client procedure (S522), returns to S502, and executes the process.

If the destination address and the destination port number are the same as the previous ones, the communications processor 50 determines whether a connection is maintained with a communications counterparty concerned (S520). If the connection is maintained with the communications counterparty, the communications processor 50 returns to S510 to transfer data in the clear, while, if the connection is not maintained with the communications counterparty, the existing Http client procedure is re-used (S522), returns to S502, and executes the process.

Figure 13:
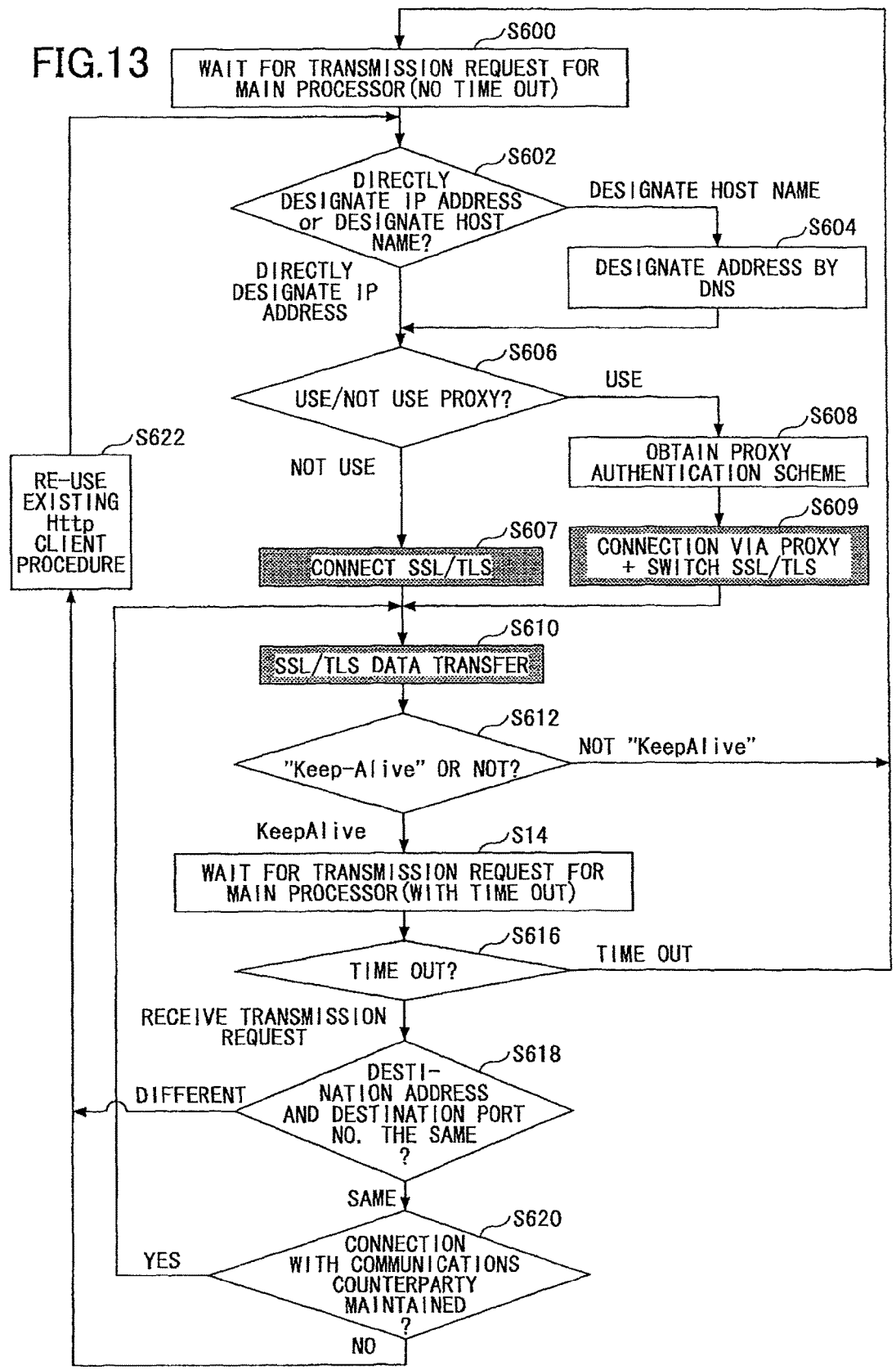
FIG. 13 is a flowchart illustrating a flow of a process executed by the communications processor 50 when communicating with SSL/TLS data.

FIG. 13 is a flowchart illustrating a flow of a process executed by the communications processor 50 when communicating with SSL/TLS data.

First, the communications processor 50 turns into a state in which it waits for a transmission request from the main processor 40 (a network transmission request) (S600). No time out is set for this state.

When the transmission request from the main processor 40 is received, the communications processor 50 determines whether a direct designation of an IP address is made or a designation of a host name is made in the transmission request (S602).

When the host name is designated, a DNS 50H of the communications processor 50 functions, performing an address resolution by DNS (S604).

Next, the communications processor 50 determines whether using a proxy is designated in the transmission request (S606). If no, the communications processor 50 performs an SSL/TLS connection (S607).

On the other hand, if yes, it performs processes of S400 and S402 in FIG. 11 with the proxy server and obtains a proxy authentication scheme (S608). Then, it switches a communications scheme to a connection via a proxy plus SSL/TLS (S609).

Next, the communications processor 50 performs transferring of SSL/TLS data (S610).

Next, the communications processor 50 determines whether "Keep-Alive" is designated in the transmission request (S612).

If not, the communications processor 50 returns to the state in S600 in which it waits for requesting transmission.

If yes, the communications processor 50 turns into a state in which it waits for a transmission request from the main processor 40 with a time out set (S614). When a time out is reached, the communications processor 50 returns to a state in S600 in which it waits for a transmission request.

If a transmission request is received before the time out is reached, the communications processor 50 determines whether a destination address and a destination port number are the same as previous ones (S618). If the destination address and the destination port number are different from the previous ones, the communications processor 50 reuses an existing HTTP client procedure (S622), returns to S602, and executes the process.

If the destination address and the destination port number are the same as the previous ones, the communications processor 50 determines whether a connection is being maintained with a communications counterparty concerned (S620). If the connection is maintained with the communications counterparty, the communications processor 50 returns to S610 to transfer data in the clear, while, if the connection is not maintained with the communications counterparty, the existing HTTP client procedure is re-used (S622), returns to S602, and executes the process.

As the communications processor 50 may autonomously perform such a process, inconveniences that an application process by the main processor 40 is delayed by processes for establishing communications (for example, processes for establishing proxy communications, an SSL handshake) may be suppressed. As a result, an impact that a processing burden related to communications has on equipment control may be reduced.

Energy Saving Control

The control apparatus 30 may perform a control for conducting communications with the external apparatus 62 via the network 60 even when the main processor 40 is in a sleep state. Below, control in such a state that is called "energy saving control" is described.

Figure 14:
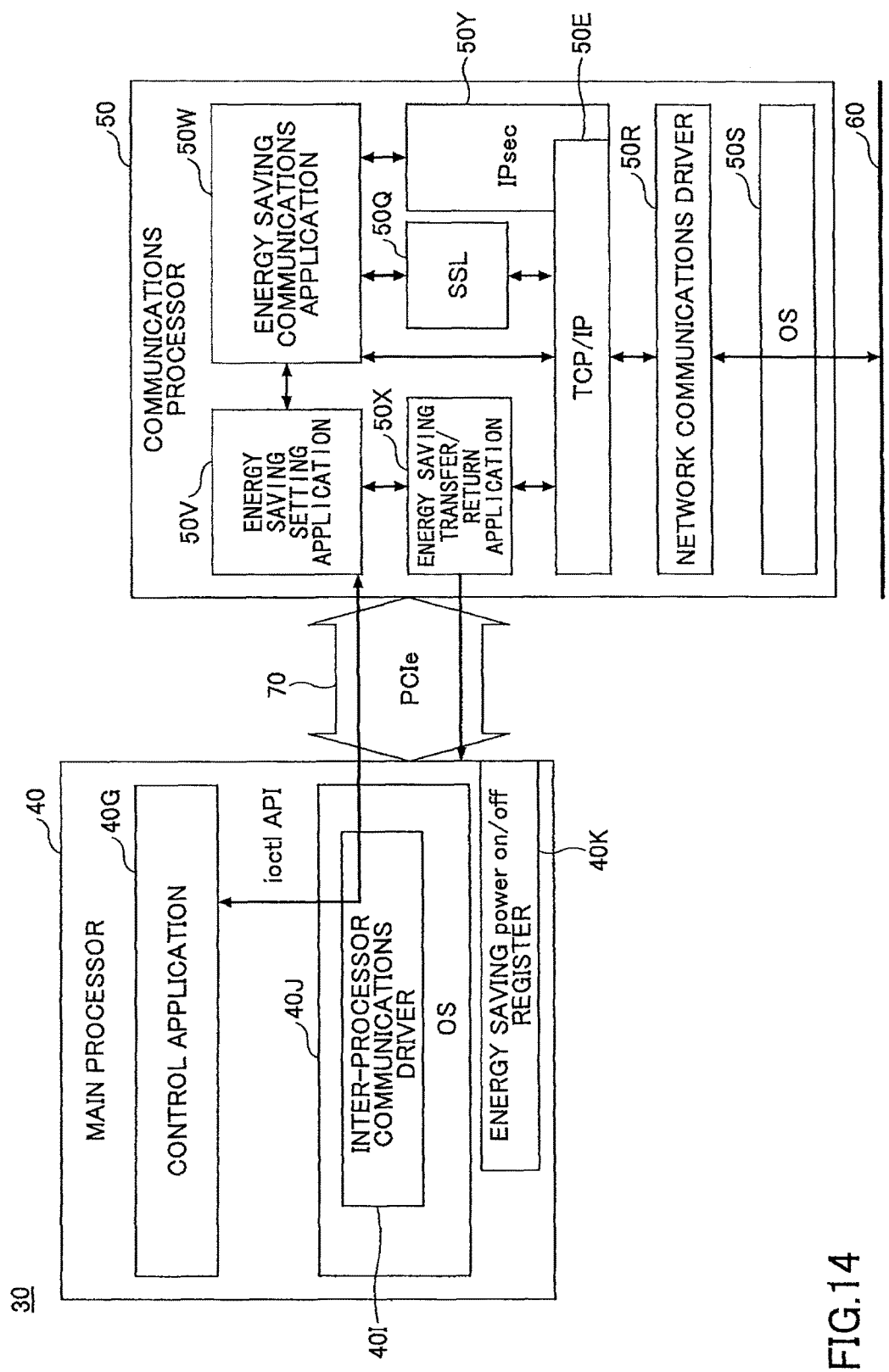
FIG. 14 is a diagram illustrating a software arrangement of the control apparatus 30 when conducting energy saving control.

FIG. 14 is a diagram illustrating a software arrangement of the control apparatus 30 when conducting energy saving control. In this state, an OS 40J including an inter-processor communications driver 40I, and a control application 40G operate on the main processor 40 of the control apparatus 30. The energy saving control is performed with reference to an energy saving Power On/Off register 40K.

On the other hand, an energy saving setting application 50V, an energy saving communications application 50W, an energy saving transfer/return application 50X, etc., operate on the communications processor 50 of the control apparatus 30.

When a predetermined operation is performed on the input apparatus 20 by the user or when a non-usage state continues for at least a predetermined time period, etc., the energy saving control is started.

Figure 15:
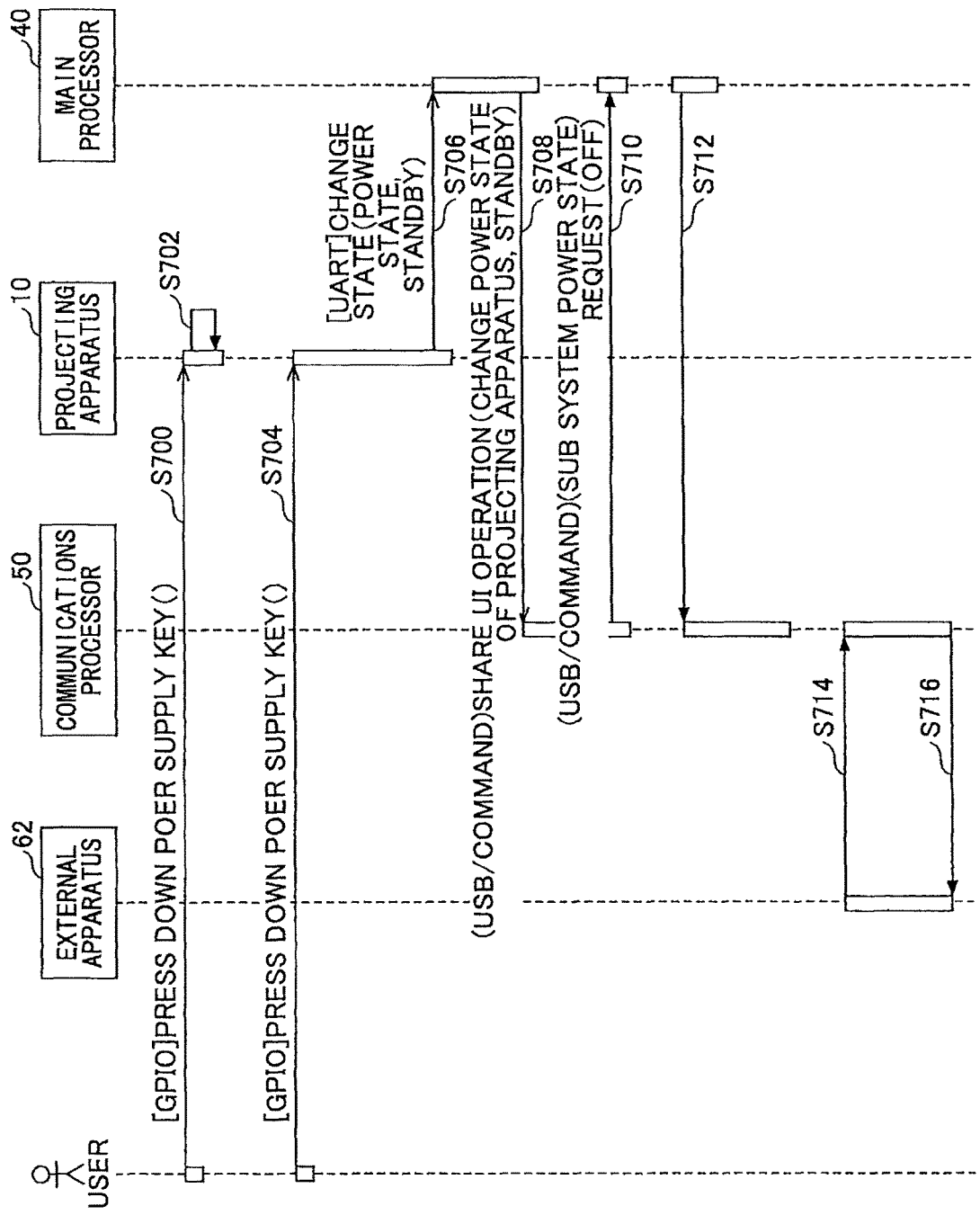
FIG. 15 is a flowchart illustrating a flow of a process when the energy saving control is started.

FIG. 15 is a flowchart illustrating a flow of a process when the energy saving control is started.

First, when the user presses down a power supply key included in the input apparatus 20 (S700), the projecting apparatus 10 performs a confirmation display in a display screen (S702).

When the user presses down the power supply key again (S704), the projecting apparatus 10 reports to the main processor 40 to change the power state to standby (S706).

Next, the main processor 40 reports to the communications processor 50 that the power state of the projecting apparatus was changed (S708). In response thereto, the communications processor 50 requests that the main processor 40 be changed to a sleep state (S710).

The main processor 40 transmits, to the communications processor 50, equipment management information held by the control application 40G (S712), transferring to the sleep state. The equipment management information transmitted here includes apparatus error information, video input information, AV mute information, lamp time, etc., for example.

The communications processor 50 stores received equipment management information in a memory apparatus 54, etc. This makes it possible to respond without launching the main processor 40 when the external apparatus 62 inquires about equipment state information, etc., via the network.

Such a control makes it possible to monitor a state of the projector 1 from outside while keeping the main processor 40 in the sleep state. This makes it possible to realize monitoring of an apparatus state and reducing of power consumption as needed.

Conclusion

The above-described control apparatus 30 according to the present embodiment makes it possible to reduce an impact that a processing burden related to communications has on equipment control.

Moreover, energy-saving control may be performed to realize monitoring of an apparatus state and reducing of power consumption as needed.

The best mode for carrying out the invention has been described in the foregoing using the embodiments as described above. However, the present invention is not limited to such embodiments as described above and may be applied various alterations and replacements without departing from the spirit of the present invention.

For example, what the control apparatus of the present invention is applied to is not limited to a projector, so that it may be applied to any apparatus including a multifunctional unit, a printer, a mobile terminal, a mobile element, etc., as long as it includes a communications unit and multiple processors.

The present application is based on Japanese Priority Application No. 2011-242720 filed on Nov. 4, 2011, the entire contents of which are hereby incorporated by reference.

The invention claimed is:

1. A control system, comprising:
a first processor configured to connect to a network; and
a second processor including a user interface, and configured to communicatively connect to the first processor and perform equipment control based on equipment control related information input via the user interface and equipment control related information obtained by the first processor from the network; wherein
the first processor is configured to conduct equipment control protocols and communication related cryptographic processing, the equipment control protocols including
converting data received via the network into application data to be transmitted and received by a process in an application layer,
dividing the application data, and
sending the application data to the second processor, and
the communication related cryptographic processing including performing cryptographic processes on communications data,
the second processor and the first processor are configured to perform the process in the application layer using the application data and the cryptographic process in parallel, respectively,
the second processor is configured to transmit the information on equipment to be controlled to the first processor when the second processor transfers to a sleep state, the first processor is configured to respond to an inquiry on the information for the equipment to be controlled from an external equipment unit connected to the network when the second processor is in the sleep state, and the equipment control includes controlling a projecting apparatus based on the equipment control related information input via the user interface and the equipment control related information obtained by the first processor over the network.

2. The control system as claimed in claim 1, wherein the first processor is configured to hierarchically perform a process of a transport layer, an Internet layer, a data link layer, and a physical layer; and the performing the process of the application layer is performed during communication between the first processor and the second processor.

3. The control system as claimed in claim 1, wherein the second processor is configured to perform the equipment control using the received data while intermittently receiving additional data from the first processor.

4. The control system as claimed in claim 1, wherein the second processor is configured to control the projecting apparatus based on projecting data obtained via the network through the first processor.

5. The control system as claimed in claim 1, further comprising:

an input apparatus including a power supply key, the input apparatus configured to cause the projecting apparatus to display a confirmation display screen upon a first power supply key press, and transmit a signal to the second processor indicating a changing of a power state of the projecting apparatus to standby upon a second power supply key press.

6. The control system as claimed in claim 5, wherein the second processor is further configured to detect that the power state of the projecting apparatus was changed to standby, and transmit a report to the first processor indicating that the projecting apparatus was changed to standby; and the first processor is further configured to transmit a request to the second processor to change to standby mode, and receive equipment management information from the second processor.

7. The control system as claimed in claim 6, wherein the equipment management information includes at least one of apparatus error information, video input information, AV mute information, and lamp time information.

8. A communications control system for a control apparatus, the control system comprising:

a first processor configured to connect to a network; and a second processor including a user interface, and configured to communicatively connect to the first processor and perform equipment control based on equipment control related information input via the user interface and equipment control related information obtained by the first processor from the network; wherein the first processor is configured to hierarchically perform a process of a transport layer, an Internet layer, a data link layer, and a physical layer in communication via the network, the first processor is configured to conduct equipment control protocols and communication related cryptographic processing, the equipment control protocols including converting data received via the network into application data to be transmitted and received by a process in an application layer, dividing the application data, and sending the application data to the second processor, and the communication related cryptographic processing including performing cryptographic processes on communications data, the second processor and the first processor are configured to perform a process of the application layer using the application data and the cryptographic process in parallel, respectively; and the second processor is configured to transmit the equipment control related information to the first processor when the second processor transfers to a sleep state, the first processor is configured to respond to an inquiry on the equipment control related information from an external equipment unit connected to the network when the second processor is in the sleep state, and the equipment control includes controlling a projecting apparatus based on the equipment control related information input via the user interface and the equipment control related information obtained by the first processor over the network.

9. The system as claimed in claim 8, wherein second processor is further configured to control the projecting apparatus to project an image based on projecting data obtained via the network by the first processor.

10. The control system as claimed in claim 8, further comprising:

an input apparatus including a power supply key, the input apparatus configured to cause the projecting apparatus to display a confirmation display screen upon a first power supply key press, and transmit a signal to the second processor indicating a changing of a power state of the projecting apparatus to standby upon a second power supply key press.

11. The control system as claimed in claim 10, wherein the second processor is further configured to detect that the power state of the projecting apparatus was changed to standby, and transmit a report to the first processor indicating that the projecting apparatus was changed to standby; and the first processor is further configured to transmit a request to the second processor to change to standby mode, and receive equipment management information from the second processor.

12. The control system as claimed in claim 11, wherein the equipment management information includes at least one of apparatus error information, video input information, AV mute information, and lamp time information.

13. A method for controlling an apparatus comprising:

connecting, using a first processor, to a network;

performing, using a second processor configured to communicatively connect to the first processor, equipment control based on equipment control related information input via a user interface and equipment control related information obtained by the first processor from the network;

conducting, using the first processor, equipment protocol control and communication related cryptographic processing, the equipment control protocols including, converting data received via the network into application data to be transmitted and received by a process in an application layer, dividing the application data, and sending the application data to the second processor, and the communication related cryptographic processing including performing, using the first processor, cryptographic processes on communications data in parallel to the performing, using the second processor, the process in the application layer using the application data, transmitting, using the second processor, the information on equipment to be controlled to the first processor when the second processor transfers to a sleep state;

responding, using the first processor, to an inquiry on the information for the equipment to be controlled from an external equipment unit connected to the network when the second processor is in the sleep state; and the equipment control including controlling a projecting apparatus based on the equipment control related information input via the user interface and the equipment control related information obtained by the first processor over the network.

14. The method as claimed in claim 13, further comprising:

hierarchically performing, using the first processor, a process of a transport layer, an Internet layer, a data link layer, and a physical layer; and the performing the process of the application layer is performed during communication between the first processor and the second processor.

15. The method as claimed in claim 13, wherein the performing the equipment control includes using the received data while intermittently receiving additional data from the first processor.

16. The method as claimed in claim 13, wherein the controlling the projecting apparatus includes projecting an image using the projecting apparatus based on projecting data obtained via the network through the first processor.

17. The method as claimed in claim 13, further comprising:

an input apparatus including a power supply key, the input apparatus configured to cause the projecting apparatus to display a confirmation display screen upon a first key press, and transmit a signal to the second processor indicating a changing of a power state of the projecting apparatus to standby upon a second key press receiving, using the second processor, a signal indicating a changing of a power state of the projecting apparatus to standby from an input apparatus including a power supply key upon a second power supply key press, the receiving occurring after the projecting apparatus was caused to display a confirmation display screen upon a first power supply key press.

18. The method as claimed in claim 17, further comprising:

detecting, using the second processor, that the power state of the projecting apparatus was changed to standby;

transmitting, using the second processor, a report to the first processor indicating that the projecting apparatus was changed to standby;

transmitting, using the first processor, a request to the second processor to change to standby mode; and receiving, using the first processor, equipment management information from the second processor.

19. The method as claimed in claim 18, wherein the equipment management information includes at least one of apparatus error information, video input information, AV mute information, and lamp time information.

* * * * *